(12) United States Patent
Schemel (10) Patent No.: US 6,386,504 B1
(45) Date of Patent: May 14, 2002

(54) VARIABLE SIZE FOOD MOLDING TRAY

(76) Inventor: Francis Schemel, Jesuit Community, Georgetown University, Washington, DC (US) 20057

( * ) Notice: Subject to any disclaimer, the term of this patent is extended or adjusted under 35 U.S.C. 154(b) by 0 days.

(21) Appl. No.: 09/522,368

(22) Filed: Mar. 9, 2000

(51) Int. Cl.⁷ .............................................. B29C 33/00
(52) U.S. Cl. ....................... 249/102; 249/155; 249/158; 249/163; 249/DIG. 1
(58) Field of Search ................................ 249/102, 155, 249/163, 168, 169, DIG. 1, 158

(56) References Cited

U.S. PATENT DOCUMENTS

| | | | |
|---|---|---|---|
| 84,908 A | 12/1868 | Rogers | 249/136 |
| 559,788 A | * 5/1896 | Perrottet | 249/170 |
| 872,422 A | 12/1907 | Hodell | 83/651.1 |
| 899,292 A | * 9/1908 | Carter | 249/102 |
| 994,832 A | 6/1911 | Hall | 249/168 |
| 1,223,226 A | 4/1917 | Wells | 249/169 |
| 1,714,379 A | 5/1929 | Kratz | 249/169 |
| 1,717,579 A | * 6/1929 | Pape | 249/155 |
| 4,055,892 A | 11/1977 | Del Vecchio | 30/303 |
| 4,195,402 A | 4/1980 | Leffer | 30/114 |
| 5,259,586 A | * 11/1993 | Miller, Sr. | 249/99 |

* cited by examiner

*Primary Examiner*—Nam Nguyen
*Assistant Examiner*—Donald Heckenberg
(74) *Attorney, Agent, or Firm*—Rogers H. Flagg (57) ABSTRACT

A variable size food molding tray apparatus is disclosed, having at least two flat base portions of uniform thickness, with selected sizes in length and width. Multiple frame portions each having a groove along the inner and outer side receive the outer perimeter of the selected flat base portion. Multiple latches are positioned in spaced relation on the second end of the frame portions. The multiple catches are aligned with a movable latch positioned on the top side of the first end of each adjacent frame portion, to releasably secure the frame portions about the selected flat base portion, to form an open topped enclosure there-between. The open topped enclosure receives the food ingredients to be molded, and once the food has set, the multiple frame portions are removed, for ease of cutting the molded food into segments.

14 Claims, 6 Drawing Sheets

VARIABLE SIZE FOOD MOLDING TRAY

BACKGROUND OF THE INVENTION

1. Field of the Invention

The present invention relates to a variable size food molding tray useful for food preparation.

2. Background of the Invention

Many foods are prepared in quantity, and subsequently cut into segments for serving to a group of consumers. Foods, such as fudge, are typically poured into a suitable mold or container to harden, and then cut into segments prior to serving. Foods, such as JELLO, are typically poured into a suitable mold or container, and refrigerated to harden, and then cut into segments prior to serving. Foods, such as cake, are typically poured into a suitable mold or container to bake, and then cut into segments prior to serving. It is difficult to cut large portions of molded food into uniform segments, particularly where the food remains in the container used to cook, refrigerate or mold the ingredients, as the sides used to enclose the food ingredients get in the way of the cutting effort.

Thus, the user must first remove the molded food from the container prior to cutting, which often damages the appearance of the food, or must cut the food while still in the container, which is time consuming and complicates the removal of the individual segments from the container.

One solution is disclosed in U.S. Pat. No. 4,055,892 which issued to Del Vecchio on Nov. 1, 1977. His food dicer has a slide out bottom and a hinged lid. The hinged lid has multiple cutters forming a grid, which is used to cut the soft food as the lid is closed, and the slide out bottom enables the user to remove the food from the enclosure, after cutting. One suggested use is for cutting JELLO, however, no provision is made to seal his enclosure prior to pouring liquid JELLO into the mold in preparation for freezing. Thus some liquid is likely to leak through the cracks formed between the removable bottom and the sides of the container prior to freezing, with a resultant cleanup mess. The sliding bottom of Del Vicchio cannot be easily sealed, as taught in applicant's invention.

SUMMARY OF THE INVENTION

Applicant's invention provides for the releasable securement of elongated side portions about a selected flat base portion, to prepare a pre-selected quantity of food. The flat base portion is selected from a plurality of flat base portions having different sizes to accommodate different quantities of molded food. This saves in the initial cost, storage space and cleanup of several large food molding trays or containers of various sizes.

Each of the plurality of flat base portions has a uniform thickness about its perimeter, which is releasably secured within a suitably sized groove located on the inner side of each of the frame portions, to enable the user to selectively mold a variety of food products within the assembled enclosure. Once the food product has been molded within the selected base and frame portions, the user releases a securement means to remove the frame portions from the flat base portion.

Each of the frame portions are adapted to selectively receive more than one size flat base portion, enabling the user selectively prepare a pre-selected quantity of molded food within the variable food molding tray.

Once the molded food has set within the food molding tray, the frame portions are removed from the selected base portion for ease of cutting the molded food into individual food portions. The selected flat base portion also serves as support for the molded food during serving, which eliminates the need to remove the molded food from the food molding tray prior to cutting and serving.

Foods, such as candy, cake, JELLO, butter, cheese, aspic, sandwiches, and other known molded foods, may be prepared and molded in bulk, and then cut into uniform segments using this invention.

The food ingredients, including liquid Ingredients such as water and oil, may be placed into the enclosure formed by the selected flat base portion and the removable frame portions, without danger of the liquid leaking from the food molding tray.

The food held In applicants assembled food molding apparatus may be refrigerated, heated, or let stand at room temperature, in accordance with the requirements of the food to be molded, or the preference of the user.

Where the elongated side portions and the flat base portion are made of plastic, such as polyethylene, the enclosure may be placed in a microwave oven for ease of cooking, prior to cutting. Likewise, plastic components also lend themselves well to refrigeration and freezing.

Where it is desirable to bake the food ingredients in a convection oven, the base portion and frame portions may be made of metal, such as aluminum or stainless steel.

Once the food has been prepared and placed into the food molding tray apparatus and allowed to firmly set, the frame portions may be easily removed from the selected flat base portion by releasing the securement means and removing the frame portions from the selected flat base portion. This enables the molded food to be easily cut into uniform segments by a variety of cutting means, such as a knife, spatula, or a plurality of spaced wires extending between opposing sides of a cutting frame to form a wire grid there-between.

The flat base portions and frame portions of this invention are preferably rust resistant and are easily cleaned by hand or machine washed to maintain a sanitary food preparation environment.

The frame portions are easily removed from the selected flat base portion, for ease of cleaning, transport and storage.

Other features and advantages of the invention will be apparent from the following description of the invention, with reference to the accompanying drawings, which illustrate by way of non-limiting examples several embodiments thereof.

DETAILED DESCRIPTION OF THE PREFERRED EMBODIMENTS

As best shown in FIG. 1 through FIG. 8, the food molding tray apparatus 10 comprises several flat base portions 12 of varying sizes, each having a uniform thickness 16 about the outer parameter of the flat base portion 12.

Preferably, the selected flat base portion 12 is selected from a plurality of flat base portions 12, 14, each having a different length and width. The different lengths and widths of each of the selected flat base portions 12, 14 serve to provide different quantities of molded food, so that the food molding tray apparatus 10 may be adapted to serve varying quantities of molded food according to the needs of the user. If the user is serving a small group of people, such as 12 to 24 people, then a smaller flat base portion 12 may be selected. However, if the user is serving a larger group of people, such as 40–60 people, then a larger flat base portion 14 is selected.

Other flat base portions may be selected to accommodate other sized groups of people. For example, a 9 inch by 9 inch flat base portion will produce 36 one and one-half inch square portions. A 12 inch by 15 inch flat base portion will produce 80 one and one-half inch square portions. Other flat base portion sizes will likewise produce other portion quantities and portion sizes, to suit the needs of the user, and such alternate sizes are intended to fall within the scope of this disclosure, and the following claims.

More than one flat base portion 12, 14 is preferably included with the food molding tray apparatus 10, to provide more than one sized food molding enclosure. Each of the selected flat base portions 12, 14 are selected to have a different length and width, with the selected flat base portions each having a uniform thickness about the outer perimeter of each of the flat base portions 12, 14, etc. Where more than one base portion 12, 14, etc. is provided, each shall have a uniform thickness 16 about the outer perimeter to enable the outer perimeter of the base portion 12, 14, etc. to fit within the first elongated groove 40 located on each frame portion 20, 22, 24, 26, etc.

The frame portions 20, 22, 24, 26 each have an inner side 28, a top side 30, an outer side 32, a bottom side 34, a first end 36 and a second end 38.

A first, elongated groove 40 extends substantially the length of the inner side 28 of each of the frame portions 20, 22, 24, 26, etc. The first elongated groove 40 is sized to closely receive the uniform thickness of one side of the flat base portions 12, 14, etc. as best shown in the embodiments shown in FIG. 2A through 2C. Each first elongated groove 40 preferably has a bottom portion 41, a back portion 42 and a top portion 43.

Where the food molding enclosure is intended for use with liquid ingredients, such as water, oil, etc., applicant prefers to provide a first resilient sealing means 45, such as an elongated, resilient rod or tubular member 46, preferably made of rubber, foam, or other resilient material, which is inserted into the first elongated groove 40. See FIG. 2A.

Figure 2A:
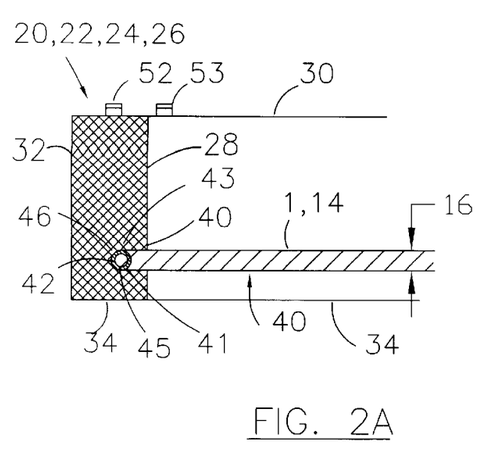
FIG. 2A is a cross sectional view of a portion of the assembled food molding tray apparatus, showing a sealing means installed within a groove, taken along lines 2—2 in FIG. 1.
Figure 2B:
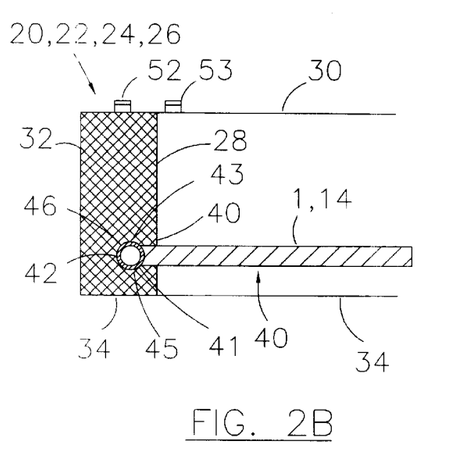
FIG. 2B is an alternate cross section view of a portion of the assembled molding tray apparatus, showing an enlarged tubular sealing means installed within an enlarged portion of the groove, taken along lines 2—2 in FIG. 1.

An enlarged aperture 48 sized to closely receive the first resilient sealing means 45 may be provided at the back portion 41 of the first elongated groove 40 to resist the separation of the sealing means 45 from the first elongated groove 40 during normal use, cleaning, etc., as shown in FIG. 2B.

Figures 2C, 4:
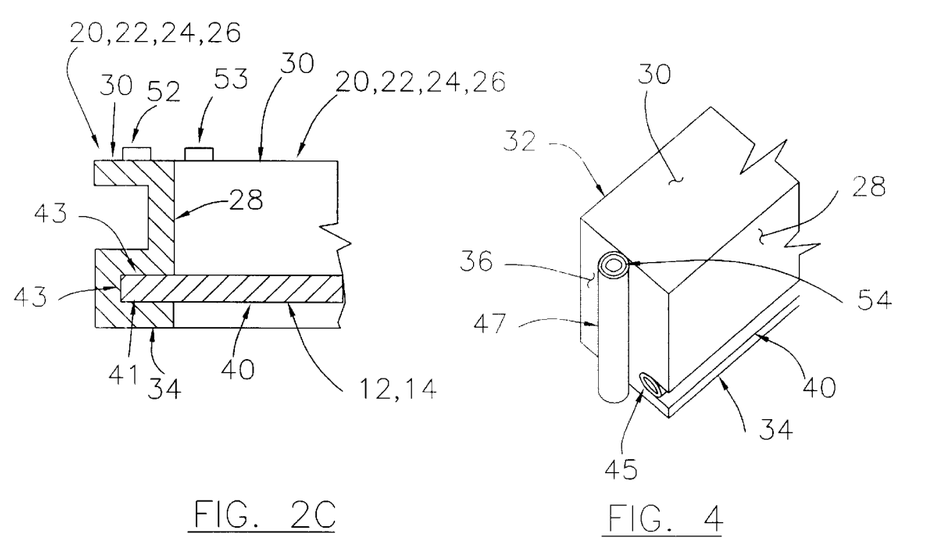
FIG. 2C is an alternate cross section view of a portion of the assembled molding tray apparatus, shown without resilient sealing means.
FIG. 4 is an end view showing a second resilient sealing means extending from the bottom to the top of the first end of one of the frame portions of the food molding apparatus.

Alternately, the first elongated groove may be used to closely receive the uniform thickness of the flat base portion 12, 14, without a resilient sealing means, as shown in FIG. 2C.

A second resilient sealing means 47 is preferably secured to the first end 36 of each of the frame portions 20, 22, 24, 26, to provide a seal between adjacent frame portions, as shown in FIG. 4. A second groove 54 may be provided on the first end 36 of each of the frame portions 20, 22, 24, 26 to partially receive the second resilient sealing means 47. The second resilient sealing means 47 preferably extends between the bottom side 34 and the top side 30 of the first end 36 of each of the frame portions 20, 22, 24, 26, as shown in FIG. 4. Note that the securement means 50 is not shown in FIG. 4 to better show the second groove 54 located in the first end 36 of the frame portions 20, 22, 24, 26.

The second resilient sealing means 47 may be secured by gluing, or by other known conventional means. Where a second groove 54 is not used, the second resilient sealing means 47 may be secured directly to the first end 36 of each of the frame portions 20, 22, 24, 26 by any conventional means, such as by bonding, gluing, heat sealing, etc.

Figure 1:
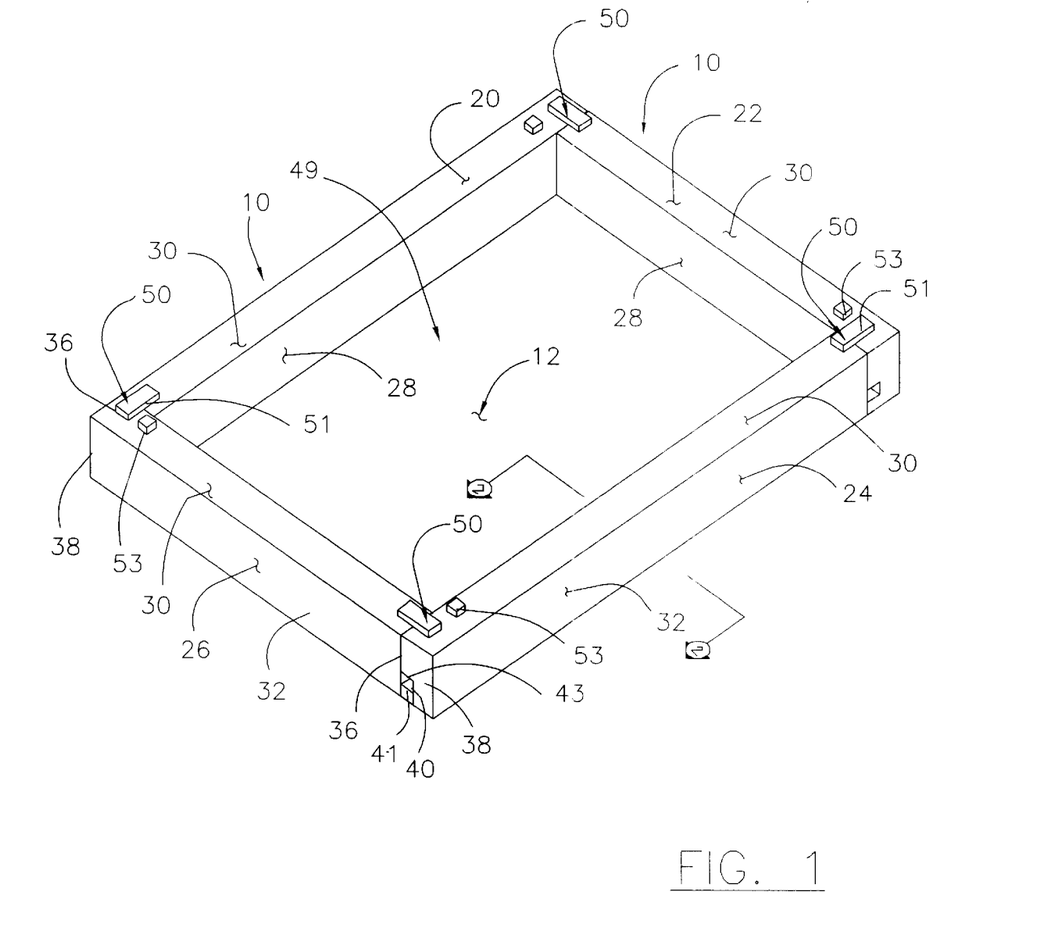
FIG. 1 is a perspective view of the molding food tray apparatus, with the frame portions releasably secured about a selected flat base portion.
Figure 3A:
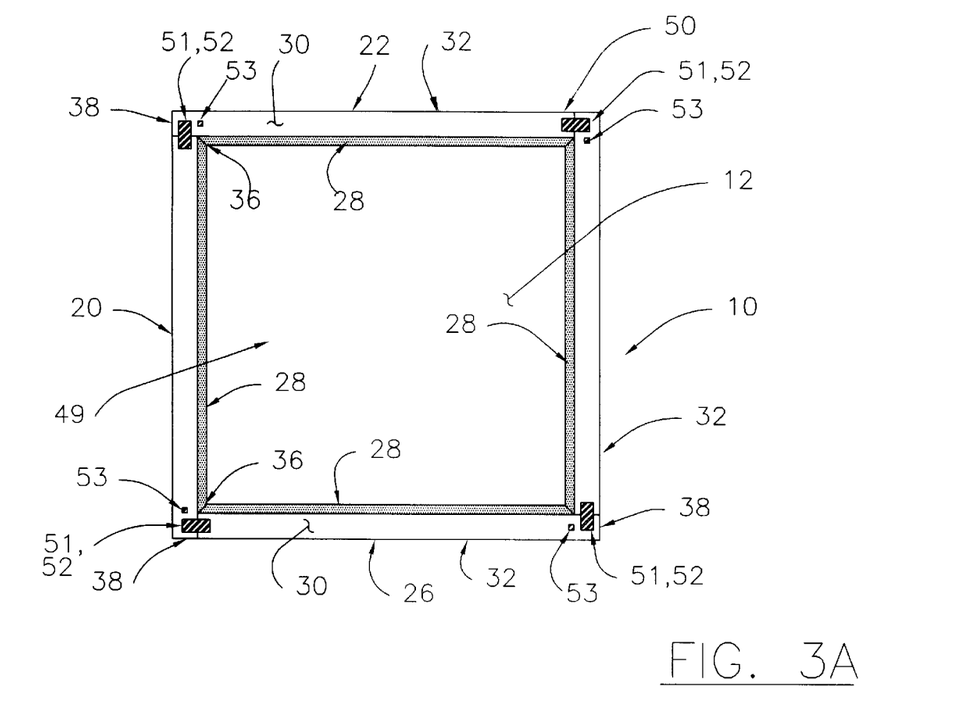
FIG. 3A is a top view of the frame portions of the molding tray apparatus, releasably secured about a selected larger sized flat base portion.
Figure 3B:
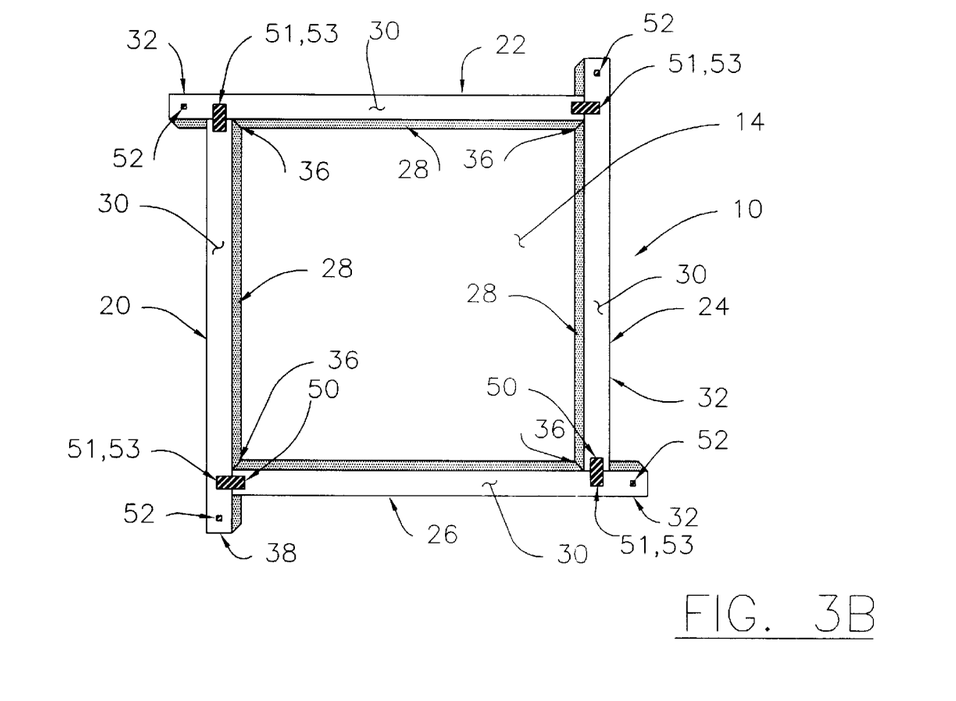
FIG. 3B is a top view of the frame portions of the molding tray apparatus, releasably secured about a selected smaller sized flat base portion.
Figure 5:
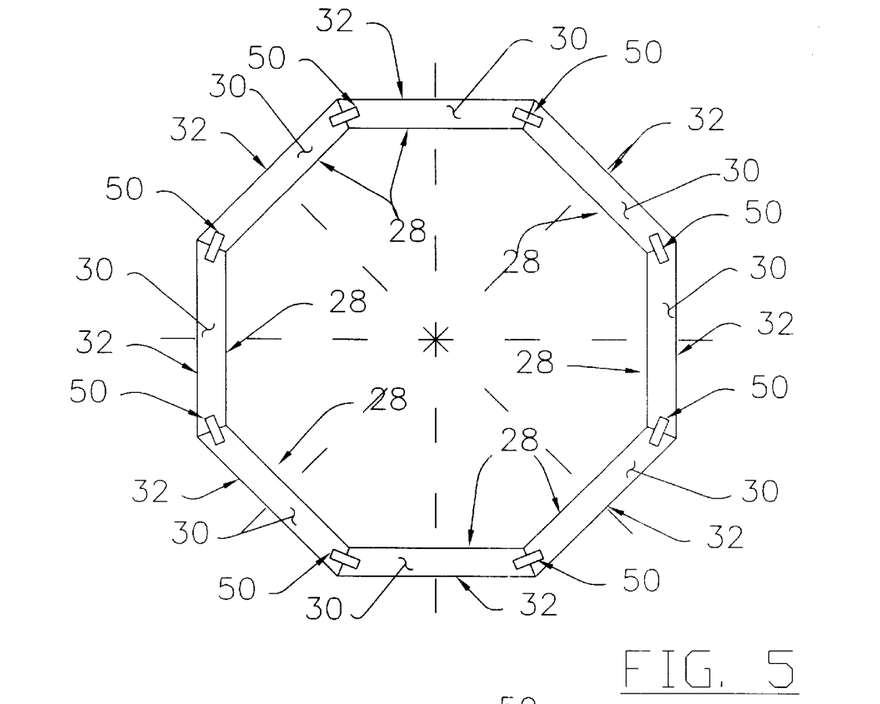
FIG. 5 is a top view of the molding apparatus, wherein the flat base portion has a plurality of sides.

As shown in FIG. 1, FIG. 3 and FIG. 5, a securement means 50 preferably comprises a movable latch 51 secured on the top 30 of the frame portions 20, 22, 24, 26 in proximity to the first end 36. Latch 51 is positioned to engage a suitable catch 52 secured on the top side 30 in proximity to the second end 38 of the frame portions 20, 22, 24, 26. The catch 52 is positioned to secure adjacent frame portions 20 to 22; 22 to 24; 24 to 26; and 26 to 20, in a manner to secure the selected flat base portion 12 within the first, elongated groove 40, forming a four sided enclosure 49 there-between.

While the movable latch 51 and catch assembly 52, 53 shown in FIG. 1 is preferred, any known releasable securement means 50 may be used to releasably secure the elongated side portions 20, 22, 24, 26 about the selected flat base portion 12, 14, without departing from this invention, or from the scope of the following claims.

More than one releasable securement means 50, such as catch 52, 53 may be secured to the top 30 of the frame portions 20, 22, 24, 26 in spaced relation from the second end 38. The second catch 53 is positioned to secure adjacent side portions 20 to 22, 22 to 24, 24 to 26; and 26 to 20 about a smaller selected flat base portion 14, while engaging the uniform thickness 16 of the perimeter of the selected flat plate portion 14 within the first elongated groove 40.

This enables the user to easily prepare different quantities of food, in the adjustably sized enclosure 49, in accordance to the quantity of food needed.

While a larger flat base portion 12 and a smaller flat base portion 14 have been shown, it is well within the scope of this invention to provide a plurality of flat base portions, 12, 14, etc., each having a different length and width, with correspondingly positioned catch means 52, 53, etc. positioned on the frame portions 20 to provide a variety of sizes of enclosures 49, and such adaptations are intended to fall within the scope of this disclosure, and within the scope of the following claims.

For example, three flat base portions: 9 inches by 9 inches, 9 inches by 12 inches, and 12 inches by 12 inches, and four frame portions 13 inches long, can be releasably secured about a selected flat base portion by securing a movable latch 51 and two catches 52, 53 on each frame portion 20, 22, 24, 26, etc. to provide three sizes of food molding tray 10 to accommodate different quantities of molded food. Commercial sizes of 18 inches to 60 inches in length and/or width would find utility where larger quantities of food portions are needed.

Of course, other sizes and quantities may also be used without departing from the scope of this disclosure, or from the scope of the following claims. Commercial users would favor larger sizes, whereas the three flat base portion sizes referenced above would be useful for small groups or for home use.

Once assembled, the molding tray apparatus 10 disclosed herein may be used to selectively cook, freeze, refrigerate, or let the prepared food stand until ready to cut into substantially uniform segments 60, in accordance with food preparation instructions.

Once the food within the enclosure 49 has hardened sufficiently to cut into segments 60, the elongated side portions 20, 22, 24, 26 are removed from the flat base portion 12, leaving the molded food supported upon the selected flat base portion 12, 14, etc. for ease of cutting and serving.

Any suitable cutting means 70 may be used, such as a knife, spatula, circular cutter or wire cutting grid.

Thus, an adjustably sized food molding tray 10 having a plurality of flat base portions 12, 14 is provided with removable frame portions 20, 22, 24, 26 sized to receive any selected one of the plurality of selected flat base portions 12, 14. The removable side portions 20, 22, 24, 26 are releasably secured to an adjacent side portion to retain the selected flat base portion in a groove provided in each of the removable side portions 20, 22, 24, 26, to enable the user to easily prepare a molded food item 18, in varying quantity according to the needs of the user.

Once the food has set within the tray molding apparatus 10, the side portions 20, 22, 24, 26 are removed from about the selected base portion, 12, 14, etc., allowing the user to quickly and easily cut the molded food into pre-determined uniform food segments with a suitable cutting means 70.

The height of the side portions 20, 22, 24, 26 above the selected flat base portion 12, 14, etc. establishes the maximum thickness of each food portion molded within the tray molding apparatus.

With the frame portions 20, 22, 24, 26 removed from the selected flat base portion 12, 14, the elements of this invention may be easily stored, transported or cleaned, in preparation for future use. The flat base portions 12, 14 are selected to provide a pre-determined quantity of food segments 60. The removable frame portions 20, 22, 24, 26 are configured to provide releasable securement to a variety of flat base portion sizes 12, 14, etc. by providing a suitable releasable securement means 50, such as movable latch 51 and associated catches 52, 53, etc. The releasable securement means 50 is positioned to releasably secure the frame portions 20, 22, 24, 26 about a any selected size flat base portion 12, 14, etc.

Figure 6:
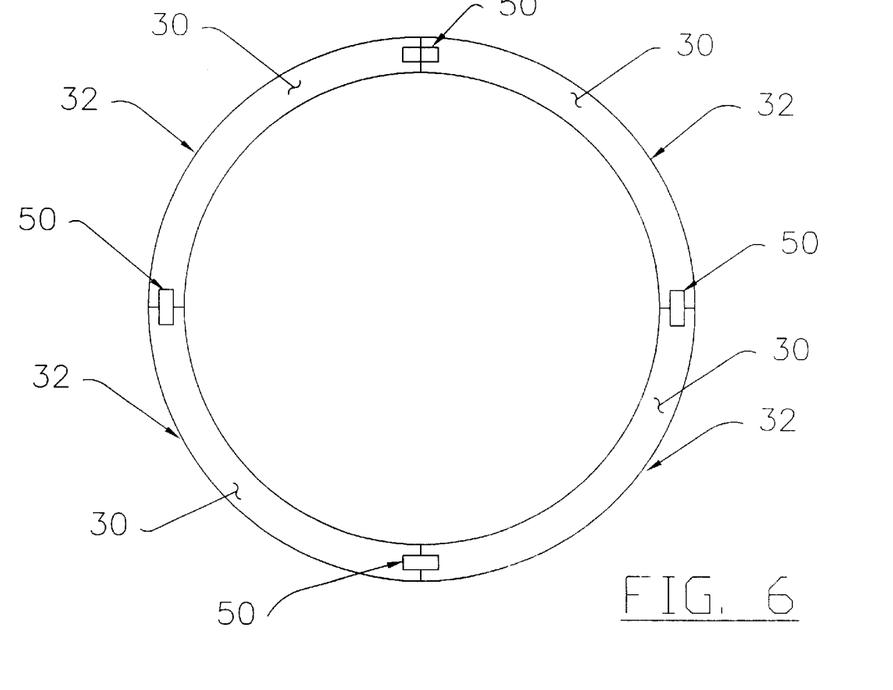
FIG. 6 is a top view of the molding apparatus, wherein the flat base portion is of a circular configuration, and the frame portions are segments of the outer periphery of the circular configuration.

The flat base portions shown in FIG. 1 through 4 are shown as rectangular shapes. However, a variety of sizes and shapes, such as square, round, rectangular, multisided, oval, may be adapted for use as shown in FIGS. 5 and 6. The frame portions 20, 22, 24, 26, etc. will be sized to conform to the shape and size of the flat base portion 12, 14, etc. Where round or oval flat base portions are used, the frame portions will be flexible curved segments, sized to surround and closely receive the flat base portion in the first elongated groove 40 located on the inner side 28 of each of the frame portions 20, 22, 24, 26. Different sizes may be accommodated by selectively providing different quantities of frame portions 20, 22, 24, 26, etc.

Where multisided flat base portions are used, the frame portions are sized to fit each side of the flat base portion, in a manner to form a raised portion surrounding the outer perimeter of the multisided flat base portion. The first and second ends 36, 38 of each of the frame portions 20–26, etc. are angled to abut the adjacent frame portion, and the releasable securement means 50 is positioned to releasably secure one frame portion 20 to an adjacent frame portion 22, etc., thus forming an open topped enclosure there-between.

Figure 7:
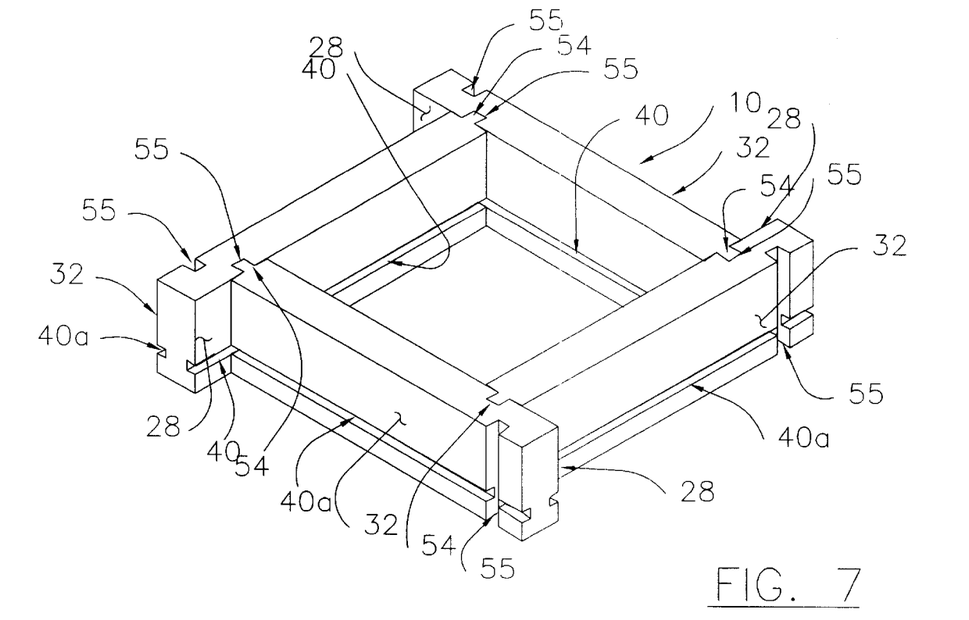
FIG. 7 is a perspective view of an alternate embodiment, utilizing a tongue and groove releasable securement means to form a small size food molding tray apparatus.
Figure 8:
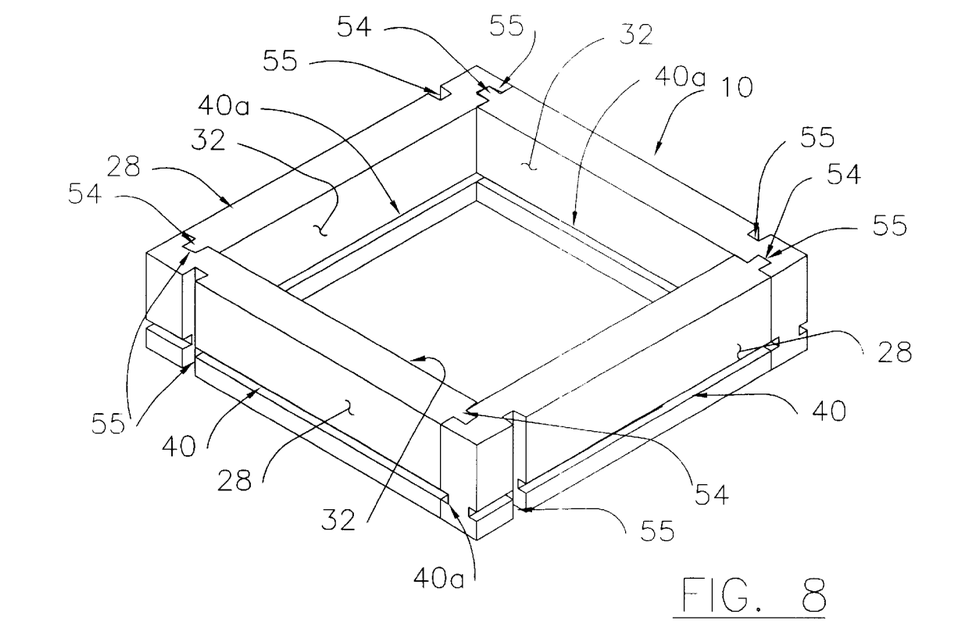
FIG. 8 is a perspective view of the embodiment shown in FIG. 6, utilizing a tongue and groove releasable securement means to form a large size food molding tray apparatus.
Figure 9:
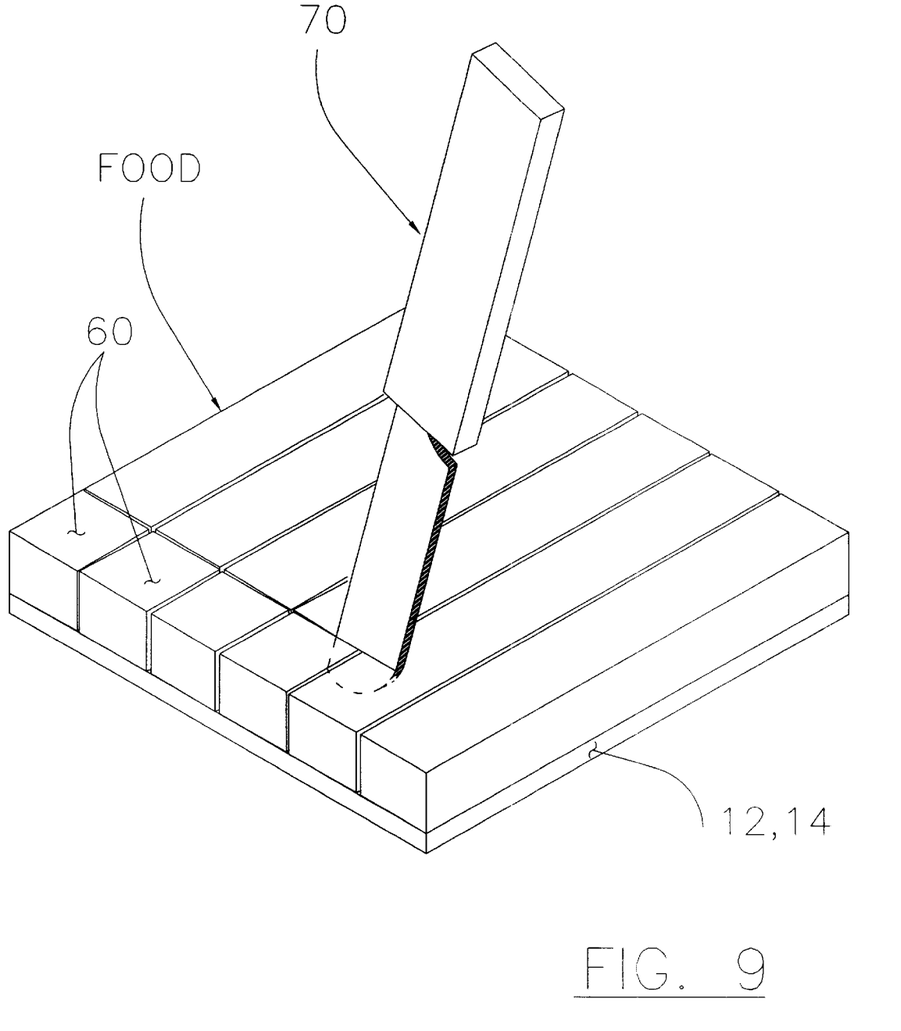
FIG. 9 is a perspective view of the food molding tray apparatus, with the frame portions removed, in preparation for cutting the food portions into uniform segments with a suitable cutting means.

In a preferred alternate embodiment of this invention, the securement means 50 is Integrally formed within the frame portions 20, 22, 24, 26, for instance, by using a tongue 54 and locking groove 55 arrangement as shown in FIG. 7 and FIG. 8. In this embodiment, the individual frame portions are assembled together by removably inserting a tongue 54 that extends from a first end 36 of each frame portion into a locking groove 55 formed in the side of the adjacent frame portion. This integral securement means 50 allows the frame portions to be releasably assembled to form the integral food molding tray apparatus.

As shown in FIGS. 7 and 8, a different size base portion 12, 14 is accommodated by reversing the inner side 28 and outer side 32 of the individual frame portions 20, 22, 24, 26. Locking grooves 55 are formed in both the inner side 28 and the outer side 32 of each frame portion 20–26. A tongue 54 extends from the first end 36 of each of the frame portions 20–26. In a first arrangement, the tongues 54 are inserted into the locking grooves 55 on the inner side 28 of the adjacent frame portions 20, 22, etc. This arrangement is used with the larger sized base 14 to form a larger sized food molding tray apparatus, as shown in FIG. 8. In a second arrangement, the inner sides 28 and outer sides 32 of the frame portions 20–26 are reversed, allowing the tongue 54 in each of the adjacent frame portions 20–26 to be inserted into the locking grooves 55 on the outer side 32 of the frame portions. This arrangement is used with a smaller sized base 12 to form a smaller food molding tray apparatus.

To secure the base portion 12 or 14 in place when the locking grooves 54 in the outer side 32 of the frame portions 20–26 are used, each frame portion 20–26 in this embodiment has a second elongated groove 40a that extends substantially the length of the outer side 32 of the frame portion 20–26. The first elongated groove 40 and the second elongated groove 40a may each accept the base portion 12 or 14 as described with reference to the other embodiments.

The grooves 40 and 40a in this embodiment may also implement the first resilient sealing means 45 and second resilient sealing means 47 as described above.

The first three sides of the frame portions may be easily assembled by sliding the tongue 54 into the locking grooves 55. The base portion 12, 14 may then be inserted into the elongated grooves 40 in the first three sides of the frame portions 20, 22, 24. Once the base portion has been fully inserted into the elongated grooves 40 in the first three sides of the frame portions 20, 22, 24, the fourth frame portion 26 may then be assembled by sliding the tongue 54 into the respective locking grooves 55. The bottom lip of the fourth frame portion 26 is resilient, allowing the bottom lip to be biased over the remaining edge of the base portion 12, 14, completing the assembly of the base portion 12, 14 and the four side frame portions 20–26. The process is reversed, to remove the four side frame portions 20–26 from the base portion 12, 14 in preparation for cutting the molded food into segments in preparation for serving.

This embodiment of the invention allows the elimination of additional parts for ease of manufacture, assembly and cleaning. It is otherwise used identically as described with reference to the other embodiments.

Thus, while the novel food molding tray apparatus 10 has been fully disclosed and described herein, numerous modifications and adaptations will become readily apparent to one of ordinary skill in this art, and such adaptations and modifications are intended to be included within the scope of the following claims.

I claim:

1. A food molding tray apparatus, which comprises:
    a) two or more different sized flat base portions having a uniform thickness;
    b) multiple frame portions, each frame portion having a top side, an inner side, an outer side, a bottom side, a first end, and a second end, with the inner side of each of the frame portions having a first elongated groove extending substantially the length of each of the multiple frame portions, the first elongated groove sized to closely receive the uniform thickness of a selected flat base portion therein;
    c) a second elongated groove extending substantially the length of the outer side of each of the multiple frame portions, the second elongated groove sized to closely receive the uniform thickness of a selected flat base portion therein;
    d) a securement means for releasably securing adjacent frame portions, said securement means comprising a tongue and locking groove arrangement formed integrally with the frame portions, wherein each of said multiple frame portions has: a tongue extending from its said first end; one or more locking grooves formed in its said inner side; one or more locking grooves formed in its outer side; said first or second elongated grooves to closely and selectively receive the thickness of a selected flat base portion therein;
    wherein said frame portions are removably assembled about said selected flat base portion by engaging the tongue of one of said frame portions in a locking groove of an adjacent one of said frame portions to form an open topped enclosure for use in the preparation of food, and wherein different sized base portions may be used depending on whether the tongue engages said locking grooves on the first side or the second side of said frame portions, the adjacent frame portions to be slidably removed from said flat base portion for ease of cutting the food portions into uniform food segments.

2. The apparatus of claim 1, wherein the first elongated groove on the inner side of each of the multiple frame portions is sized to closely receive a first resilient sealing means therein, to form a liquid tight seal between the assembled flat base portion and the respective frame portion, and a second resilient sealing means is secured to the inner side of the first end of each of the frame portions, the second resilient sealing means extending substantially between the top side and the bottom side of each of the elongated side portions to provide a liquid tight seal between the first end of the side portion and the adjacent, inner side of the elongated side portions, when the flat base portion and the elongated side portions are releasably secured together by the plurality of securement means.

3. The apparatus of claim 2, wherein the first sealing means comprises a resilient, tubular member extending substantially the length of the first elongated groove; and the second sealing means comprises a resilient, tubular member secured in a groove extending substantially between the top and bottom inner side of the first end of each of the frame portions.

4. The apparatus of claim 1, wherein the flat base portion is rectangular in shape, and the first and second ends of the multiple frame portions are positioned perpendicular to the inner side of the frame member.

5. The apparatus of claim 1, wherein the selected flat base portion is circular in shape, and the multiple frame portions are arcuate in shape to conform to the outer parameter of the selected circular flat base portion.

6. The apparatus of claim 1, wherein the flat base portion is of a multisided configuration, and the first and second ends of the multiple frame portions are angled to abut the adjacent frame portion, and the length of each frame portion is sized to correspond to the length of the sides of the multisided flat base portion.

7. An adjustably sized food molding tray apparatus, comprising:
    a) a first large, rectangular flat base portion, and a second smaller, rectangular flat base portion; the first and second flat base portions each having a uniform thickness about the outer parameter;
    b) at least four frame portions, each frame portion having a top side, a first side, a second side, a bottom side, a first end, and a second end, with the first side and the second side of each of the frame portions having a first elongated groove sized to closely receive the uniform thickness of a selected one of the first and second flat base portions;
    c) a first elongated sealing means disposed substantially along the entire length of at least one of the first and second grooves located in each of the at least four frame portions, and a second sealing means secured to the first end of each of the frame portions between the top and bottom sides of each of the at least four frame portions, the elongated sealing means comprising a resilient, tubular member;
    d) a tongue extending from said first end of the at least four frame portions;
    e) a first locking groove positioned in proximity to the second end of the first side of the at least four frame portions, and a second locking groove positioned in offset relation from the first locking groove on the second side of the at least four frame portions;
    f) the tongue selectively engagable with a selected one of the locking grooves located on at least one of the first and second sides of the frame portions for releasably securing adjacent frame portions together about a selected one of the flat base portions, the elongated frame portions extending above the selected flat base portion to form an open top enclosure there-between;

g) the tongue selectively released from said locking groove to enable the frame portions to be slidably removed from the selected base portion after the molded food is set, for ease of cleaning, transport and storage, and wherein the flat base portion serves as a support for the molded food while cutting and serving the individual food portions.

8. A food molding tray apparatus, comprising;

a) a plurality of different sized flat base portions to suit various quantities of molded food, the plurality of different sized flat base portions each having a uniform thickness about the outer parameter;

b) at least four frame portions, each frame portion having a top side, a first side, a second side, a bottom side, a first end, and a second end, the first side of each of the frame portions having a first elongated groove sized to closely receive the uniform thickness of a selected one of the flat base portions therein, and the second side of each of the frame portions having a second elongated groove sized to alternately and closely receive the uniform thickness of a selected one of the flat base portions therein;

c) a first elongated, resilient, tubular sealing means disposed substantially along the entire length of at least one of the first and second grooves located in each of the at least four frame portions; and a second elongated, resilient, tubular sealing means secured to the first end of each of the frame portions between the top and bottom sides of each of the at least four frame portions;

d) a tongue extending from said first end of the at least four frame portions;

e) at least two offset locking grooves located in spaced relation on at least one of the first and second sides of each of the frame portions in proximity to the second end of each of the frame portions, the tongue selectively engagable with one of said offset locking grooves to form a securement means for releasably securing adjacent frame portions together about a selected one of the flat base portions, the elongated frame portions extending above the selected flat base portion to form an open top enclosure there-between;

f) each tongue and locking groove selectively released to enable the frame portions to be slidably removed from the selected base portion after the molded food is set, for ease of cleaning, transport and storage, and wherein the flat base portion serves as a support for the molded food while cutting and serving the individual food portions.

9. An adjustable food molding apparatus comprising:

a first base portion comprising an outer perimeter, the outer perimeter of said first base portion comprising a uniform thickness;

a second base portion comprising an outer perimeter, the outer perimeter of said second base portion comprising a uniform thickness, said second base portion comprising a comparatively smaller size than said first base portion;

a plurality of frame portions, each of said plurality of frame portions comprising a top portion, a first side portion, a second side portion, a first end portion, and a second end portion, said first side portion comprising a first elongated groove extending substantially along a length of said first side portion, said second side portion having a second elongated groove extending substantially along a length of said second side portion, at least one of the first and second elongated grooves configured to receive the uniform thickness of one of said first base portion and said second base portion; and a securement mechanism for releasably securing adjacent frame portions, wherein said securement mechanism allows the plurality of frame portions to be slidably removed from one of said first base portion and said second base portion when food preparation is complete.

10. An adjustable food molding apparatus according to claim 9, further comprising:

a first resilient sealing mechanism disposed in the first elongated groove located on the first side of the frame portion, and a second resilient sealing mechanism disposed in the second elongated groove located on the second side of the frame portion, to selectively provide a liquid-tight seal between one of said first and said second base portions and one of said plurality of frame portions.

11. An adjustable food molding apparatus according to claim 9, further comprising:

a second resilient sealing mechanism disposed between the bottom side and the top side on a first end of each of said plurality of frame portions to provide a liquid-tight seal between each of said plurality of frame portions.

12. An adjustable food molding apparatus according to claim 9, which comprises a first base portion with an outer perimeter, the outer perimeter of said first base portion having a uniform thickness;

a second base portion with an outer perimeter smaller than the first base portion, the outer perimeter of said second base portion having a uniform thickness;

a plurality of frame portions, each frame portion comprising a first side, a second side, a top side, a bottom side, a first end, and a second end;

a tongue and locking groove arrangement formed integrally with each of said plurality of frame portions, wherein each of said plurality of frame portions comprises:

a tongue extending from a first end of each of said plurality of frame portions;

a locking groove formed in proximity to said second end on the first side and the second side of each of said plurality of frame portions, said locking groove sized to slidably receive said tongue therein;

a first elongated groove extending substantially the length of the first side of said plurality of frame portions and a second elongated groove extending substantially the length of the second side of said plurality of frame portions, said first and second elongated grooves configured to receive the uniform thickness of one of said first base portion, and said second smaller base portion;

wherein said plurality of frame portions are removably assembled by engaging the tongue of one of said plurality of frame portions in a locking groove of an adjacent one of said plurality of frame portions, and wherein either said first base portion or said second base portion may be used based on whether the tongue engages said locking groove formed in said first side portion or said second side portion of said plurality of frame portions.

13. An adjustable food molding apparatus according to claim 12, further comprising:

a first resilient sealing mechanism disposed in at least one of the first elongated groove and the second elongated groove on the first of second side of each frame portion to provide a liquid-tight seal between one of said first and said second base portions and one of said plurality of frame portions.

14. An adjustable food molding apparatus according to claim 12, further comprising:

a second resilient sealing mechanism extending between the top side and the bottom side of each frame portion at the second end of each of said plurality of frame portions to provide a liquid-tight seal between each of said adjacent frame portions.

\* \* \* \* \*